United States Patent
Bryant et al.

(10) Patent No.: US 11,699,269 B2
(45) Date of Patent: Jul. 11, 2023

(54) USER INTERFACE WITH AUGMENTED WORK ENVIRONMENTS

(71) Applicant: BANK OF AMERICA CORPORATION, Charlotte, NC (US)

(72) Inventors: Matthew K. Bryant, Gastonia, NC (US); Jesse Wiggins, Johnston, RI (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/411,841

(22) Filed: Aug. 25, 2021

(65) Prior Publication Data

US 2023/0065719 A1    Mar. 2, 2023

(51) Int. Cl.
| | |
|---|---|
| G06T 19/00 | (2011.01) |
| G06T 15/20 | (2011.01) |
| G06T 7/50 | (2017.01) |
| G06F 21/31 | (2013.01) |
| G01S 17/89 | (2020.01) |
| G08B 5/22 | (2006.01) |
| H04L 67/51 | (2022.01) |

(52) U.S. Cl.
CPC ............ G06T 19/006 (2013.01); G01S 17/89 (2013.01); G06F 21/31 (2013.01); G06T 7/50 (2017.01); G06T 15/20 (2013.01); G08B 5/22 (2013.01); H04L 67/51 (2022.05); G06T 2200/24 (2013.01); G06T 2207/10016 (2013.01); G06T 2207/10028 (2013.01)

(58) Field of Classification Search
None
See application file for complete search history.

(56) References Cited

U.S. PATENT DOCUMENTS

| | | | |
|---|---|---|---|
| 7,812,815 B2 | 10/2010 | Banerjee et al. | |
| 8,046,719 B2 | 10/2011 | Skourup et al. | |
| 8,982,156 B2 | 3/2015 | Maggiore | |
| 9,235,268 B2 | 1/2016 | Arrasvuori et al. | |
| 9,530,232 B2 | 12/2016 | Maciocci et al. | |
| 10,203,762 B2 | 2/2019 | Bradski et al. | |
| 10,567,449 B2 | 2/2020 | Harner et al. | |
| 10,838,574 B2 | 11/2020 | Agarawala et al. | |
| 10,846,939 B2 | 11/2020 | Aurongzeb et al. | |
| 10,878,634 B2 | 12/2020 | Montgomerie et al. | |
| 11,013,559 B2 | 5/2021 | Johnson et al. | |
| 11,093,103 B2 | 8/2021 | Agarawala et al. | |
| 11,294,474 B1* | 4/2022 | Stewart | G06F 3/011 |
| 2008/0297535 A1 | 12/2008 | Reinig | |
| 2015/0362587 A1* | 12/2015 | Rogan | G01S 7/4972 |
| | | | 702/104 |
| 2017/0169611 A1 | 6/2017 | Ramirez Flores et al. | |
| 2019/0000578 A1 | 1/2019 | Yu et al. | |
| 2019/0005838 A1 | 1/2019 | Yu et al. | |

(Continued)

Primary Examiner — Frank S Chen
(74) Attorney, Agent, or Firm — Moore & Van Allen PLLC; Nicholas C. Russell

(57) ABSTRACT

With the advent of augmented reality devices becoming increasingly prevalent, accessible, and cross-compatible, there is an opportunity to leverage the capabilities of such devices in order to streamline workflow and information access in number of contexts. The present invention provides an integrated, dynamic system for leveraging the capabilities of augmented reality systems in order to provide users with personalized information in a dependable, seamless, and secure manner.

20 Claims, 7 Drawing Sheets

(56) References Cited

U.S. PATENT DOCUMENTS

| | | |
|---|---|---|
| 2019/0102946 A1 | 4/2019 | Spivack et al. |
| 2019/0107991 A1 | 4/2019 | Spivack et al. |
| 2019/0188450 A1 | 6/2019 | Spivack et al. |
| 2019/0313059 A1* | 10/2019 | Agarawala ............ G06T 13/40 |
| 2020/0410991 A1* | 12/2020 | Jost ....................... G10L 15/22 |
| 2021/0074068 A1 | 3/2021 | Spivack et al. |
| 2021/0110191 A1* | 4/2021 | Gruteser ............... G06V 20/20 |
| 2021/0248669 A1* | 8/2021 | Wade .................... G06F 3/011 |
| 2021/0358294 A1* | 11/2021 | Parashar .............. G08C 17/02 |

\* cited by examiner

USER INTERFACE WITH AUGMENTED WORK ENVIRONMENTS

FIELD

The present invention generally relates to systems, products, and methods which utilize augmented reality in an enterprise context.

BACKGROUND

With the advent of augmented reality devices becoming increasingly prevalent, accessible, and cross-compatible, there is an opportunity to leverage the capabilities of such devices in order to enhance workflow environments and streamline information access in number of contexts, including remote-work contexts. There is a need for an integrated, dynamic, system for leveraging capabilities of augmented reality systems in order to provide users with useful, familiar, or critical information in a dependable, seamless, enjoyable, and secure manner.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for augmenting user workspaces. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

Aspects of the invention described herein provide an innovative solution for augmenting user workspaces to provide an enhanced and consistent or dynamic environment no matter the user's particular location, and depending on the user's preferences or situational requirements. The invention provides a user experience that may be both more enjoyable and more productive than conventional office or remote-work environments, and may also allow for increased efficiency through the use of intelligent gesturing and predictive adaptability. As such, the system allows for dynamic response to user input, user preferences, user data patterns, user role within an entity, or situational demands.

For instance, through the use of augmented reality systems, it is conceivable that the user's environment may be transformed via the use of virtual information overlay. In some embodiments, this may comprise a digitization of the user's individual office space through the overlay of particular environmental features on the user's actual surroundings (e.g., a virtual plant on a desk, a virtual phone nearby that the user may interact with, a virtual picture frame with a family photo overlaid on the wall nearby, or the like). In some embodiments, this may allow for increased consistency. For instance, the invention may be used to emulate the user's typical workplace environment regardless of the user's actual location (e.g., the user may be made to feel as though they are at their workplace office even though they are in a relatively blank room at their home, or the like). Not only does this give the user a sense of familiarity regardless of their actual location, it allows multiple users to utilize the same space, thereby increasing the efficiency of physical space usage. For instance, a single blank room may be utilized by two roommates or living partners to emulate their particular office spaces. In other embodiments, the same shared workspace at an office building may be reserved by one or more individuals on different days, and each of those individual users could utilize a communal workspace in an individualized manner.

In other embodiments, the invention may be utilized to replace or augment a user's typical office surroundings rather than emulate them. For instance, a user may prefer a beach setting, or a peaceful wooded porch setting, rather than their actual office space. In other embodiments, the user's task at hand may necessitate a different set of surroundings for productivity purposes. For instance, the user may be participating in a conference call with one or more other users, and the users may prefer to meet in a particular conference room at their workplace. Due to remote-work or travel, the users may not be able to physically meet in the conference room, and the system may instead emulate the feeling of being in the conference room via augmented display of other users around a table, or the like. In this way, the system may dynamically integrate one or more augmented reality systems in order to coordinate the perspective view of one or more other users in a given surrounding. In this way, certain users who benefit from the visual display of information, people, or objects may be enabled to participate in a more meaningful way versus just an audio call alone.

In still further embodiments, the system may be utilized to improve the ergonomics of the user's workspace in order to not only increase efficiency and productivity, but also provide increased convenience and accessibility to allow the user to more easily complete various tasks. For instance, in some embodiments, the system may provide gesture control to users who may require assistance with motor control. By continuously analyzing the user's gaze, location within their environment, and movement of their head, eyes, limbs, or the like (e.g., via user device cameras, infrared sensors, gyroscope sensors, LiDAR sensing, or the like), the system may be programmed to complete automated actions depending on how the user has configured the system. For example, a user may use gesture programming in order to respond to various notifications, or the like. In some embodiments, as a user receives a call, they may configure the system to recognize nodding their head up and down instructs the system to answer the call and forward the audio to a headphone device, Bluetooth device, or other connected user device. If the user shakes their head from left to right, the system may be configured to deny the call, or the like. In other embodiments, the user may interact physically with one or more aspect of the system, such as a joystick, touch pad, one or more buttons, or the like, in order to respond to incoming notifications. It is understood that this is only one specific embodiment provided for exemplary purposes, but that the system may be configured in any number of ways to integrate with various application and operating systems in order to automate actions of one or more connected devices or manipulate the augmented reality environment of the user.

For sample, illustrative purposes, system environments will be summarized. Generally the invention may comprise the steps of: receiving one or more user preference selections for a workspace environment and store the user preferences in a unique user configuration; receiving imaging data from an augmented reality system or a user device; based on the received imaging data, determining a perspective vie and surface structure of a user's surroundings; identifying one or more compatible user devices on a shared network of the one or more compatible user devices and the augmented reality system; continually transmitting a display of one or more virtual objects to the augmented reality system based on the user preference selections and received imaging data.

In some embodiments, the invention is configured to determine the one or more virtual objects or based on one or more authentication credentials provided by a user via the user device.

In some embodiments, the one or more virtual objects further comprise three dimensional virtual renderings or representations for the one or more compatible user devices.

In some embodiments, the imaging data further comprises light detection and ranging (LiDAR) data.

In some embodiments, the invention further comprises: receiving notification information from the one or more compatible user devices; and altering display of the one or more virtual objects in response to the notification information.

In some embodiments, continually transmitting a display of one or more virtual objects further comprises transmitting display information at a refresh rate of at least 30 frames per second.

In some embodiments, the invention further comprises: receiving notification information from the one or more compatible user devices; and transmitting an interactive notification prompt to the augmented reality system.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
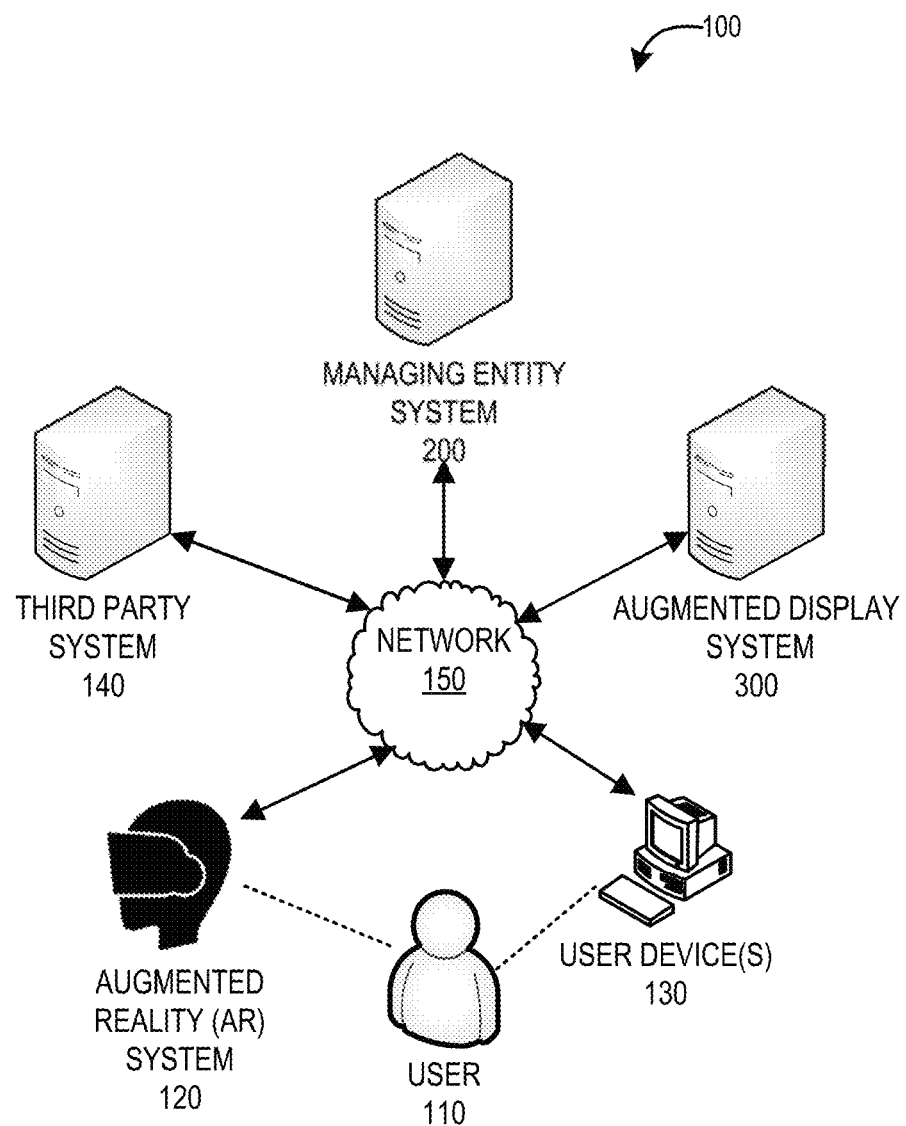
Figure 2:
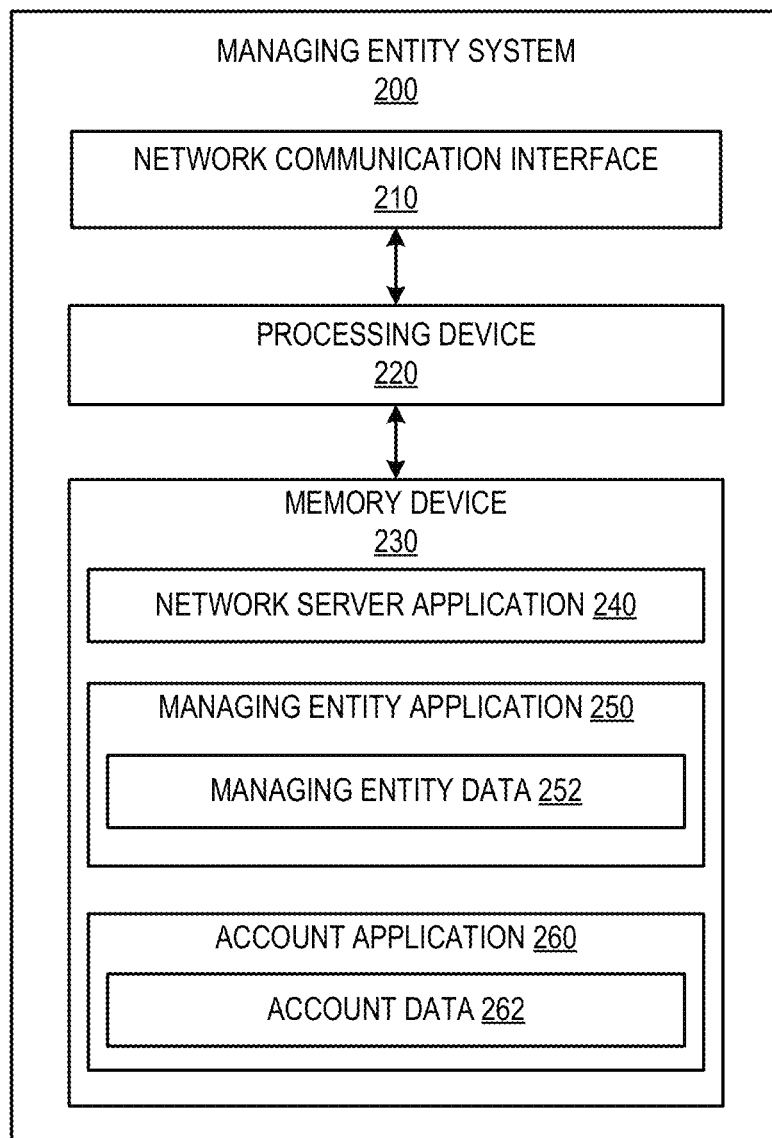
Figure 3:
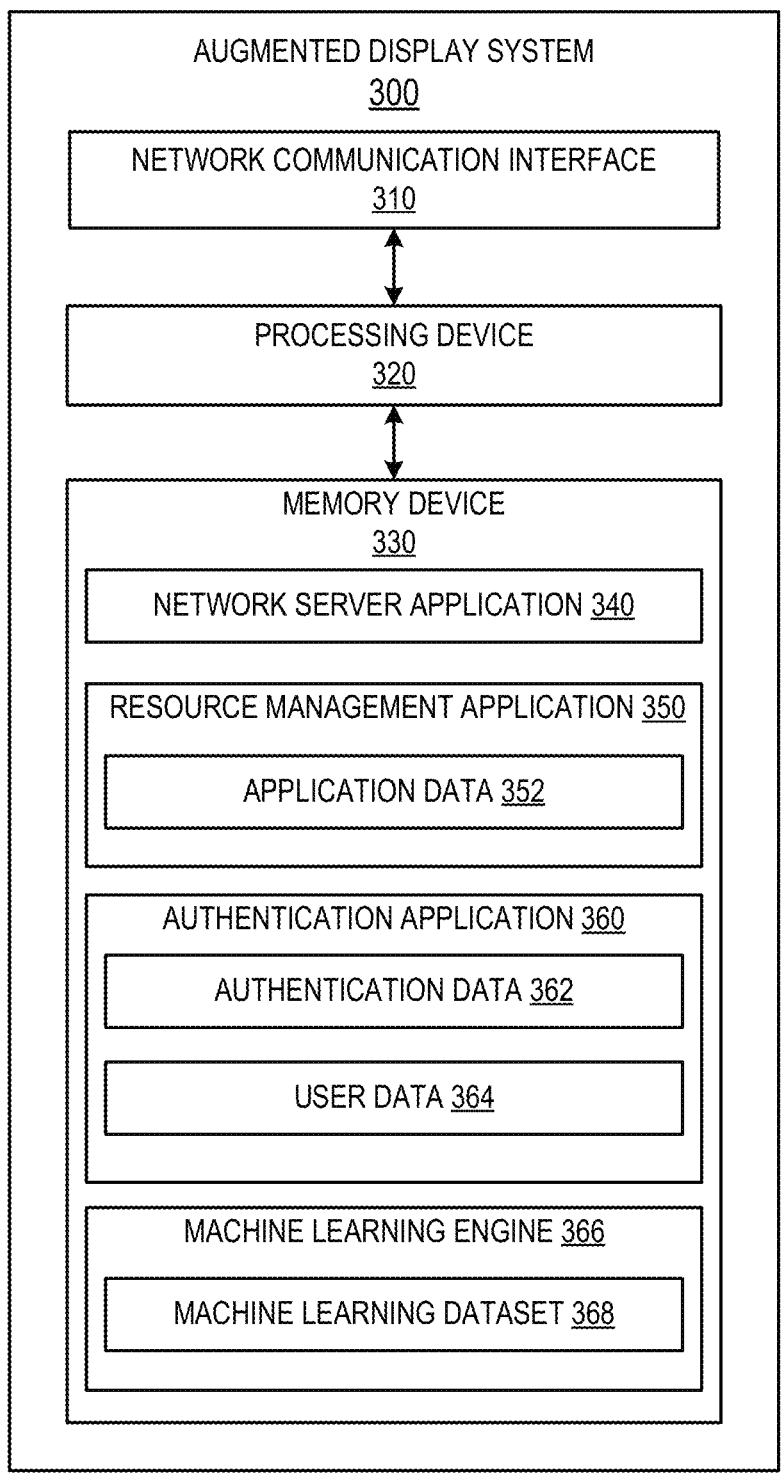
Figure 4:
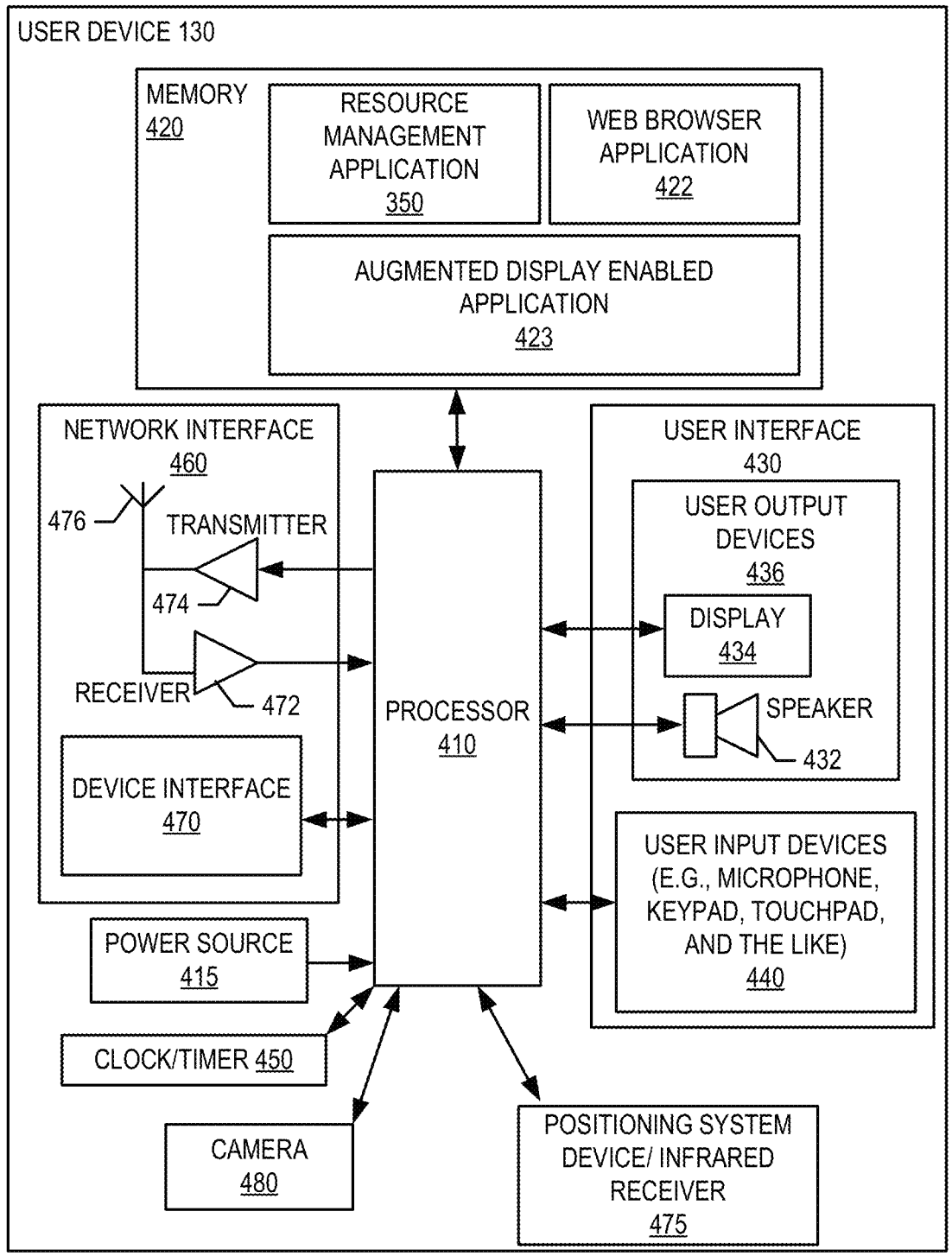
Figure 5:
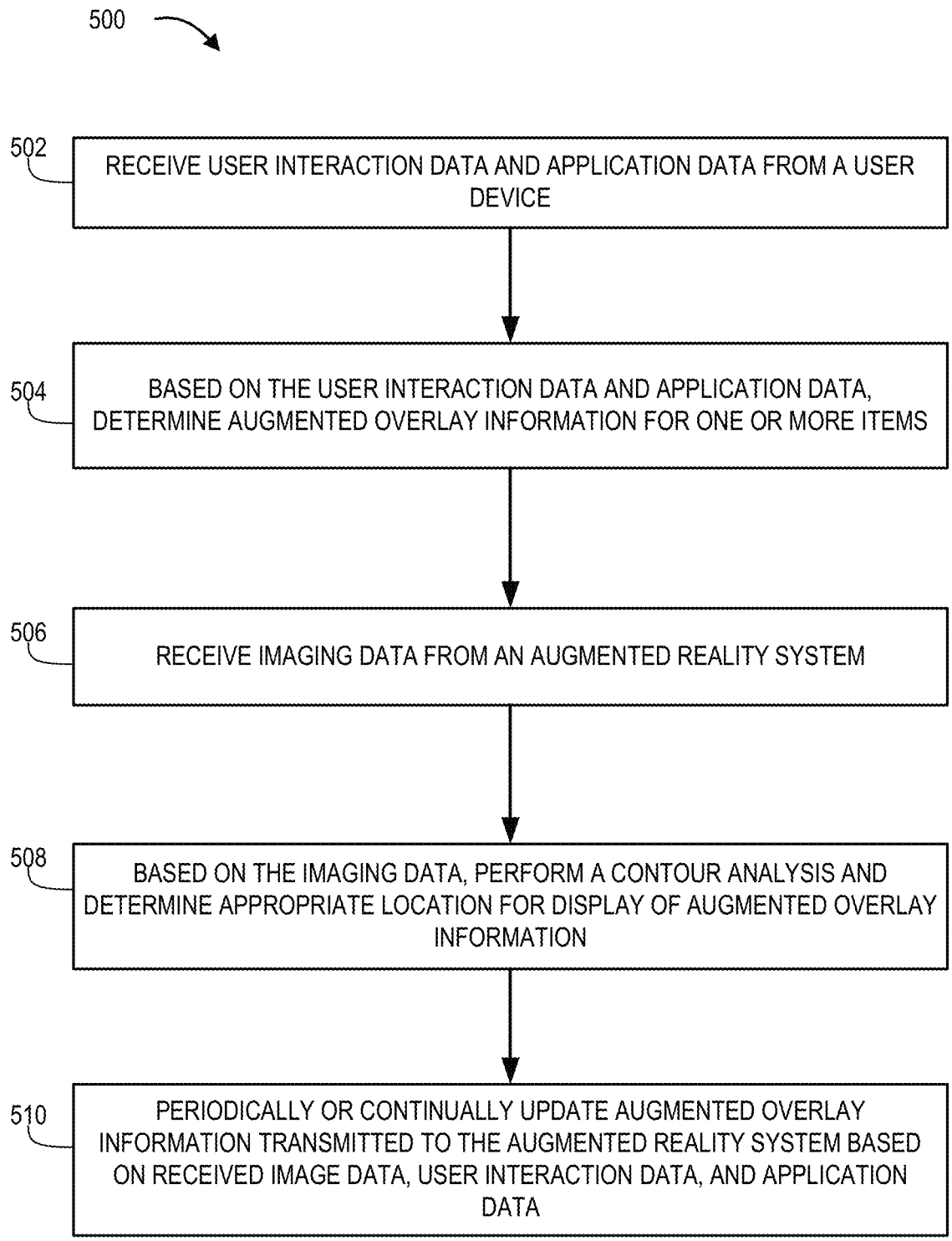
Figure 6:
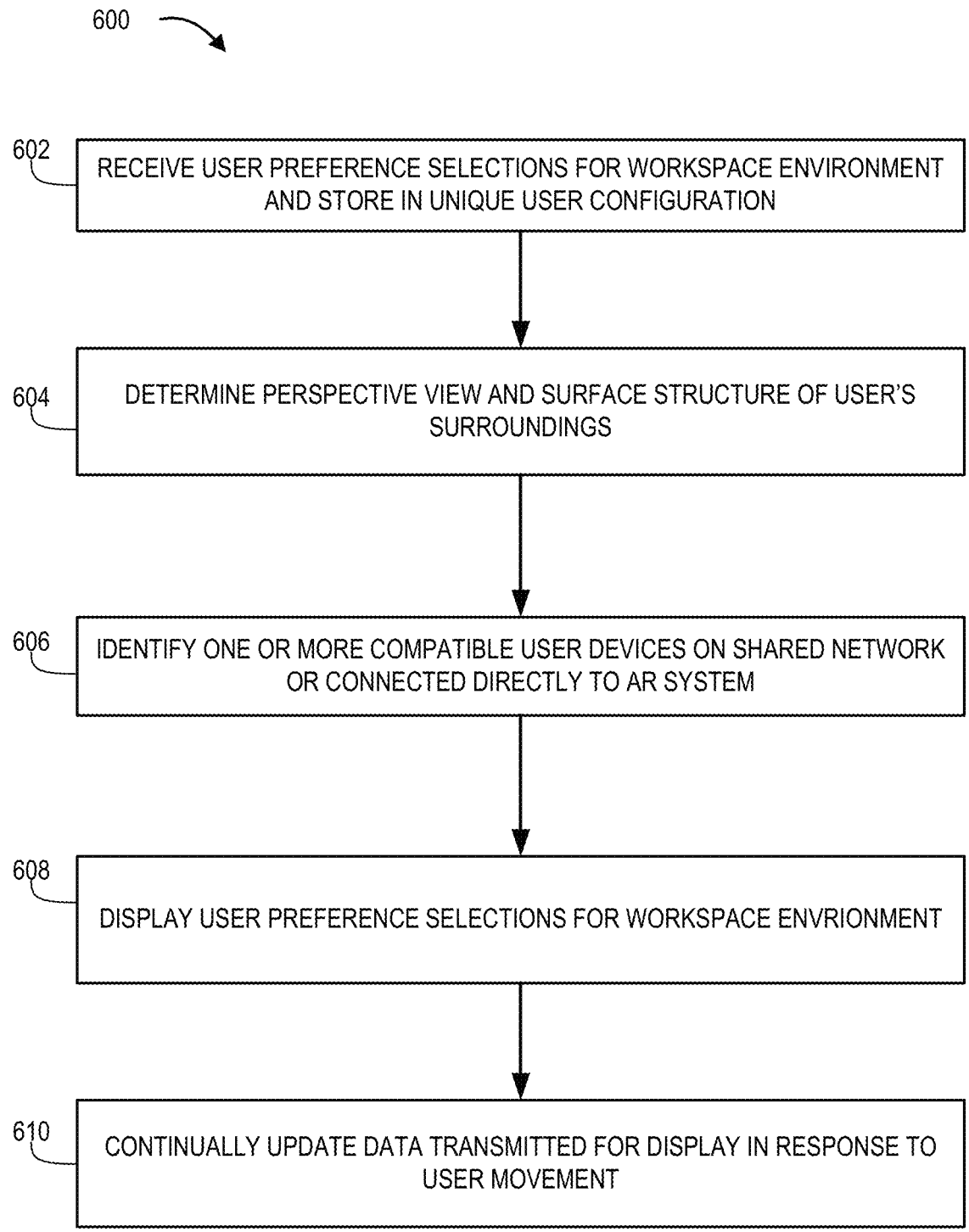
Figure 7:
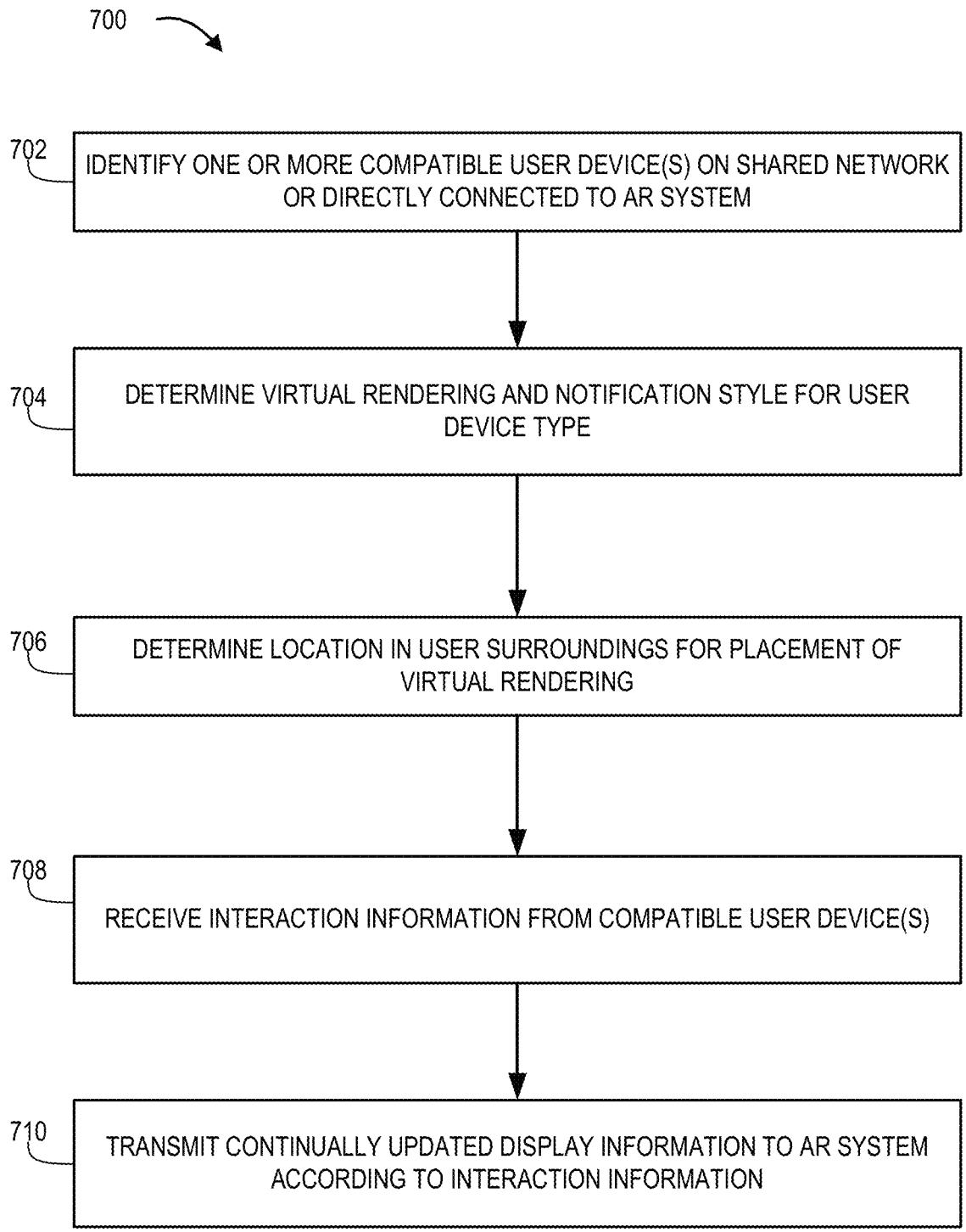

Having thus described embodiments of the invention in general terms, reference will now be made the accompanying drawings, wherein:

FIG. 1 provides a diagram illustrating a system environment, in accordance with an embodiment of the invention;

FIG. 2 provides a block diagram illustrating various components of a managing entity system, in accordance with an embodiment of the invention;

FIG. 3 provides a block diagram illustrating various components of an augmented display system, in accordance with an embodiment of the invention;

FIG. 4 provides a block diagram illustrating various components of a user device, in accordance with embodiments of the invention;

FIG. 5 provides a process flow 500 for providing a dynamically augmented display overlay, in accordance with embodiments of the invention;

FIG. 6 provides a process flow 600 for providing a user configured augmented display overlay, in accordance with embodiments of the invention; and FIG. 7 provides a process flow 700 for integrating one or more compatible user devices with a dynamically augmented display overlay, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

"Entity" or "managing entity" as used herein may refer to any organization, entity, or the like that may have one or more employees or administrators who utilize the described system, or in some cases who are responsible for managing or configuring the described system (e.g., configuring user-specific features, authorized access, or the like). In some embodiments, this may include commercial banks, thrifts, federal and state savings banks, savings and loan associations, credit unions, investment companies, insurance companies, software companies, or the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, or the like. The account is associated with and/or maintained by the entity. In other embodiments, an entity may not be a financial institution. In still other embodiments, the entity may be a merchant, or other kind of commercial entity.

"Entity system" or "managing entity system" (such as managing entity system 200) as used herein may refer to the computing systems, devices, software, applications, communications hardware, and/or other resources used by the entity to perform the functions as described herein, or used to control or configure the described systems and its components. Accordingly, the entity system may comprise desktop computers, laptop computers, servers, Internet-of-Things ("IoT") devices, networked terminals, mobile smartphones, auxiliary devices, smart devices (e.g., smart watches), network connections, and/or other types of computing systems or devices and/or peripherals along with their associated applications.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an administrator, an engineer, a manager, an analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be representative of a system performing one or more tasks described herein. In still further embodiments, a user may representative of one or more entities given access to the described systems as a service, such as a third party system user, or the like.

As used herein, a "user interface" may be any device or software that allows a user to input information, such as commands or data, into a device, or that allows the device to output information to the user. For example, the user interface may include a graphical user interface (GUI), or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, headset, and/or other user input/output device for communicating with one or more users. In some embodiments, the user interface may be a combination of devices which interface to provide an augmented display experience. For instance, the user may wear an augmented reality (AR) or virtual reality (VR) headset, also referred to herein as the augmented reality (AR) system, which interfaces with one or more other displays or devices in order to provide an overlay of additional information. In some embodiments, the user interface may be tailored to a specific user's role, access permissions, preferences, or the like, as described herein. In some embodiments, the AR system may be one or more devices that operate to display a projection to one or more users. For instance, in some embodiments, as opposed to the user wearing a headset or other device, an augmented visual overlay of the user's surroundings may be presented using a holographic projection viewable to multiple users at once. In some embodiments, one or more AR systems, whether headset or projection-type systems, may operate in cooperation with a back-end augmented display system to receive device-specific or user-specific information. For instance, the augmented display system may transmit different perspective views to different areas, users, or the like, or may alter the perspective view of the visual overlay based on a known position of one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning, or the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, a "resource" may generally refer to objects, products, devices, goods, commodities, services, or the like, and/or the ability and opportunity to access and use the same. Some example implementations herein contemplate a market value of a property held by a user, including property that is stored and/or maintained by a third-party entity. For purposes of this invention, a resource is typically stored in a resource repository—a storage location where one or more resources are organized, stored, and retrieved electronically using a computing device.

Aspects of the invention described herein provide an innovative solution for augmenting user workspaces to provide an enhanced and consistent or dynamic environment no matter the user's particular location, and depending on the user's preferences or situational requirements. The invention provides a user experience that may be both more enjoyable and more productive than conventional office or remote-work environments, and may also allow for increased efficiency through the use of intelligent gesturing and predictive adaptability. As such, the system allows for dynamic response to user input, user preferences, user data patterns, user role within an entity, or situational demands.

For instance, through the use of augmented reality systems, it is conceivable that the user's environment may be transformed via the use of virtual information overlay. In some embodiments, this may comprise a digitization of the user's individual office space through the overlay of particular environmental features on the user's actual surroundings (e.g., a virtual plant on a desk, a virtual phone nearby that the user may interact with, a virtual picture frame with a family photo overlaid on the wall nearby, or the like). In some embodiments, this may allow for increased consistency. For instance, the invention may be used to emulate the user's typical workplace environment regardless of the user's actual location (e.g., the user may be made to feel as though they are at their workplace office even though they are in a relatively blank room at their home, or the like). Not only does this give the user a sense of familiarity regardless of their actual location, it allows multiple users to utilize the same space, thereby increasing the efficiency of physical space usage. For instance, a single blank room may be utilized by two roommates or living partners to emulate their particular office spaces. In other embodiments, the same shared workspace at an office building may be reserved by one or more individuals on different days, and each of those individual users could utilize a communal workspace in an individualized manner.

In other embodiments, the invention may be utilized to replace a user's typical office surroundings rather than emulate them. In some embodiments, this may be dynamically altered according to user preferences, user data history, or situational demands. For instance, a user may prefer a beach setting, or a peaceful wooded porch setting, rather than their actual office space on a given day, depending on their mood. In other embodiments, the user's task at hand may necessitate a different set of surroundings for productivity purposes. For instance, the user may be participating in a conference call with one or more other users, and the users may prefer to meet in a particular conference room at their workplace. Due to remote-work or travel, the users may not be able to physically meet in the conference room, and the system may instead emulate the feeling of being in the conference room via augmented display of other users around a table, or the like. In this way, the system may dynamically integrate one or more augmented reality systems in order to coordinate the perspective view of one or more other users in a given surrounding. In this way, certain users who benefit from the visual display of information, people, or objects may be enabled to participate in a more meaningful way in their work environment as compared to an audio conference call or video session alone.

In other embodiments, the invention may be used to interface with one or more user devices in order to augment the user's experience with those devices and to further integrate the device into an augmented virtual environment. For instance, a user device such as a mobile phone may be integrated within the augmented workspace to appear as a desk phone that the user can interact with (e.g., the mobile phone rings, but the user sees a visualization of a desk phone on their workstation ringing, and may gesture toward the visualization of the desk phone in order to answer or deny the call). In some embodiments, the user device integrated in this manner may not necessarily be a physical device, but rather a virtual machine, or virtual communication application, such as a voice over IP (VoIP) phone (e.g., the user receives a VoIP call and the system generates a visualization of a physical desk phone which the user may interact with).

In still further embodiments, the system of the invention may adapt to user preferences and patterns in behavior in order to learn what the user prefers in their work environment, or may extrapolate patterns from a dataset of multiple users which visualizations or augmented workspaces foster more productivity on average. For instance, the system may collect and log data from one or more entity systems, programs, applications, or the like in order to discern engagement statistics for multiple users (e.g., how many hours the user spent in a category of programs such as an office suite like word processing, spreadsheet, presentation creation, or the like, versus other programs like email, which may be considered a more passive task rather than a productive application), and may correlate higher engagement statistics with certain aspects of users' augmented work environments. For instance, augmenting the user's work environment to show email previews in their periphery, and allow the user to easily and quickly address these emails (e.g., swipe away, "mark as read," or save for later, or the like) with simple gesture may increase a user's engagement with applications or programs considered to be of higher productive value. As such, the system of the invention may recommend this feature to additional users as a means to streamline workflow and help increase their productivity and efficiency.

FIG. 1 provides a diagram illustrating a system environment, in accordance with an embodiment of the invention. As illustrated in FIG. 1, the system environment 100 includes a managing entity system 200, an augmented display system 300, one or more user device(s) 130, an augmented reality (AR) System 120, and one or more third party systems 140. One or more users 110 may also be included in the system environment 100 for representative purposes. In some embodiments, the user(s) 110 of the system environment 100 may be customers of a managing entity that owns or otherwise controls the augmented display system 300 which may, in some embodiments, comprise a financial institution. In other embodiments, the user(s) 110 may be employees of a managing entity.

The managing entity system 200, the augmented display system 300, the one or more user device(s) 130, the AR system 120, and/or the third party system 140 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In some embodiments, the AR system 120 may be in connection with the network 150 only when the AR system 120 is at a certain interaction distance from one or more user device(s) 130. In this way, the AR system 120 may interact with the other systems and devices of the environment via one or more user device(s) 130. In other embodiments, the AR system 120 may be in separate connection with the augmented display system 300 or the managing entity system 200, wherein the augmented display system 300 or the managing entity system 200 is transmitting instructions to control the display interface of one or more user device(s) 130 and the AR system 120 in concert.

The managing entity system 200 may be a system owned or otherwise controlled by a managing entity to perform one or more process steps described herein. In some embodiments, the managing entity is a financial institution. In general, the managing entity system 200 is configured to communicate information or instructions with the augmented display system 300, the one or more user device(s) 130, and/or the third party system 140 across the network 150. For example, the managing entity system 200 may maintain account data for the user 110 and therefore may receive a transaction request or other event request associated with the user 110 (e.g., via a third party system 140 comprising a merchant system), compare received information to an internal database of a user associated with the user 110, and transmit authentication or other approval information to the augmented display system 300, the third party system 140, the user device 130, or the like. The augmented display system 300 may be a system owned or controlled by the managing entity and/or a third party that specializes resource management, resource exchange hosting, user authentication systems, data management, systems engineering, IT support, or the like. In some embodiments, at least a portion of the augmented display system 300 may be controlled by or otherwise be a component of the managing entity system 200.

For example, the augmented display system 300 may provide an augmented display for a network architecture system or user account configuration system. In some embodiments, augmented display system 300 provides additional tailored, user-specific detail as a user is viewing a screen. In some embodiments, a user may view an interface which contains a list of server names, and the augmentation may provide metadata or details that a user would typically have use an external system to look up, or would typically need to conduct multiple physical actions (e.g., clicks, right-clicks, taps, or the like) in order to access this additional information. This data could include information like where the server is located, who runs/manages it, what applications are running on the server, or the like. This could include metadata or detailed data that may be useful to a specific user. Each AR system 120, such as specialized glasses, goggles, or the like, may be unique to the user based on the user's role, position, or context. In other embodiments, the user may be required to log into a specific user account associated with the AR system 120 using authentication credentials, and the specific user account may be unique to the user based on the user's role, position, or context. As such, the detailed or metadata displayed may be different based on the user viewing the screen.

The user device 130 may be a system owned or controlled by the managing entity, the user 110, and/or a third party that specializes in providing computers, mobile devices, or the like. In general, the user device 130 is configured to communicate information or instructions with the managing entity system 200, the augmented display system 300, the AR System 120, and/or the third party system 140 across the network 150. For example, the user device 130 may detect an interaction with the AR system 120, extract resource management information (e.g., server location information, or information about other network resources, or the like), transmit the resource information to the managing entity system 200 and/or the augmented display system 300, and receive a confirmation or responses from the augmented display system 300. In other embodiments, the AR system 120 may interface with the augmented display system 300 in order to receive user configuration data unique to the particular user logged into the system and using it at the current time. In this way, the same AR system 120 may be used to load multiple user configurations remotely via the augmented display system 300 such that it can be used by multiple different users (e.g., multiple users may share an AR system 120 and alternate using the AR system 120 in a given time period, but may load their specific preferences and workstation attributes via user configurations stored on the augmented display system 300 or entity system 200).

The AR system 120 may comprise any device, system, set of devices, or the like that is configured to generate an experience taking place within simulated and immersive environments that can be similar to or completely different from the real world, or may augment how the user 110 perceives the real world, such as augmented reality devices, mixed reality devices, or the like. In preferred embodiments, the AR system 120 is a device which augments reality of the user's surroundings, allowing the user to stay in context of their actual surroundings, view one or more user device 130 screens, or the like, while receiving an overlay of additional (or "augmenting") information as a visual overlay on the user's actual surroundings. In some embodiments, it is conceivable that the AR System 120 may be embedded within, or otherwise be a component of, the user device 130 (e.g., a mobile phone, wearable device, personal computer, or the like). In some embodiments, the AR system 120 may use either headsets or specialized glasses designed to be placed on the head of a user 110, or multi-projected environments to generate realistic images, sounds and other sensations that simulate a virtual or semi-virtual (augmented) environment. For example, the user may wear a headset or pair of glasses with a specialized display resolution which allows the user to easily view the screen at a minimal distance of inches or less. In some embodiments, a virtual reality environment of the user's typical office space, workplace, or the like, may be emulated, allowing the user to virtually visit their place of work remotely. A user 110 using AR equipment is able to look around the artificial world, move around in it, and interact with virtual features or items. In preferred embodiments, the user is not removed from their physical surroundings and immersed in a totally virtual environment. Rather, the user is able to receive additional information via the AR system 120 in a seamless, personalized fashion wherein the information is overlaid on or otherwise augments the user's view or perspective of their existing environment. It is understood that any graphical depictions generated by the augmented display system 300 may be designed to be displayed and interacted with a number of devices, including user device(s) 130 and one or more AR system(s) 120 (e.g., multiple AR systems 120 may be integrated remotely to display common information to multiple users in a conference setting, or the like, and may be oriented with respect to one another in a consistent manner in the augmented environment).

The third party system 140 may be any system that interacts with the other systems and devices of the system environment 100 including, but not limited to, merchant systems, third party data centers, access providers, data storage systems, third party user authentication systems, transaction systems, resource exchanges, web servers, or the like. For instance, in some embodiments, the managing entity system may need to contact one or more third party system(s) 140 in order to access resource accounts and resource exchanges, gain or check regulatory approval for the movement of resources, verify transactions or occurrences on a blockchain, or share user data that may be pertinent to the experience of the user 110 as they interact with the augmented display system 300.

FIG. 2 provides a block diagram illustrating the managing entity system 200, in greater detail, in accordance with embodiments of the invention. As illustrated in FIG. 2, in one embodiment of the invention, the managing entity system 200 includes one or more processing devices 220 operatively coupled to a network communication interface 210 and a memory device 230. In certain embodiments, the managing entity system 200 is operated by a first entity, such as a financial institution.

It should be understood that the memory device 230 may include one or more databases or other data structures/repositories. The memory device 230 also includes computer-executable program code that instructs the processing device 220 to operate the network communication interface 210 to perform certain communication functions of the managing entity system 200 described herein. For example, in one embodiment of the managing entity system 200, the memory device 230 includes, but is not limited to, a network server application 240, a managing entity application 250 which includes managing entity data 252, an account application 260 which includes account data 262, and other computer-executable instructions or other data. The computer-executable program code of the network server application 240, the managing entity application 250, and/or the account application 260 may instruct the processing device 220 to perform certain logic, data-processing, and data-storing functions of the managing entity system 200 described herein, as well as communication functions of the managing entity system 200.

In one embodiment, the managing entity application 250 includes managing entity data 252. The managing entity data 252 may comprise user authorization-information for one or more users that are employees of or are otherwise associated with the managing entity. The managing entity data 252 may additionally include a list of users, user roles, user access permissions, or other data such as information for establishing secure communication channels with authentication devices, user devices 130, AR systems 120, other entity systems or the like. In some embodiments, the managing entity data 252 further comprises system architecture information, such as resource usage by various devices or virtual machines (e.g., network bandwidth, memory, processing load, or the like), status of machines connected over an entity managed network, status of one or more server(s), status of one or more virtual machine session(s), status of applications, application permissions, identified issues, unauthorized access or unauthorized attempt notifications, or the like. The managing entity data 252 may also include user configurations for storing preferences related to the user's preferred experience with one or more AR systems 120.

In one embodiment, the account application 260 includes the account data 262. This account data 262 may include financial account information for one or more users associated with the managing entity system 200, such as customers of the entity. For example, the account data 262 may comprise account numbers, routing numbers, account balances, account rules, account preferences, billing information, credit information, loan information, digital wallet information, authentication information, dynamic resource value information, expected dynamic resource value information, historical and current resource exchange information or the like. In this way, one or more employees of the managing entity system may view user account data, based on their level of access permission, such as during a customer service call, brokerage call, help session, or the like.

The network server application 240, the managing entity application 250, and the account application 260 are configured to invoke or use the managing entity data 252, the account data 254, or the like when communicating through the network communication interface 210 with the augmented display system 300, the one or more user device(s) 130, the AR System 120, and/or the third party system 140 in order to provide access to various information to be displayed on such devices.

FIG. 3 provides a block diagram illustrating the augmented display system 300, in greater detail, in accordance with embodiments of the invention. As illustrated in FIG. 3, in one embodiment of the invention, the augmented display system 300 includes one or more processing devices 320 operatively coupled to a network communication interface 310 and a memory device 330. In certain embodiments, the augmented display system 300 is operated by a first entity, such as a financial institution, while in other embodiments, the augmented display system 300 is operated by an entity other than a financial institution.

It should be understood that the memory device 330 may include one or more databases or other data structures/repositories. The memory device 330 also includes computer-executable program code that instructs the processing device 320 to operate the network communication interface 310 to perform certain communication functions of the augmented display system 300 described herein. For example, in one embodiment of the augmented display system 300, the memory device 330 includes, but is not limited to, a network server application 340, a resource management application 350 which includes application data 352, an authentication application 360 which includes a authentication data 362 and user data 354, and other computer-executable instructions or other data. The computer-executable program code of the network server application 340, the resource management application 350, and/or the authentication application 360 may instruct the processing device 320 to perform certain logic, data-processing, and data-storing functions of the augmented display system 300 described herein, as well as communication functions of the augmented display system 300.

In one embodiment, the resource management application 350 includes application data 352. The application data 352 may comprise information for storing data or information associated with one or more users, their preferences, or their current application session. The application data 352 may additionally or alternatively include information for comparing data received from third party systems 140, managing entity system 200, or the like, such as account information, web services information, application usage information, login session information, user preferences, user role within an entity, or the like, to a stored database (e.g., a relational database) of associated information. In another embodiment, the application data 352 may include resource information, for instance, when the augmented display system 300 receives information from the managing entity system 200, the resource management application 350 can parse the data and display it via one or more user device(s) 130, or partially display certain information via one or more AR system(s) 120, based on the user's preferences or permissions (e.g., the augmented display system 300 may route sensitive data to the AR system 120 in order to reduce the ability for unauthorized viewing, or the like).

In one embodiment, the authentication application 360 includes authentication data 362 and user data 364. The authentication data 362 may include passwords, personal identification numbers, security questions, unique biometric information, dynamic two-factor authentication information, system security status, authentication images (e.g., security footage, or the like), stepped-up authentication information (e.g., tiered security information allowing users to access some data, but wherein they must provide additional authentication or verification information to access other, more sensitive information), or other authentication credentials (including secondary or stepped-up authentication credentials) associated with one or more users. This authentication data 362 can be accessed by the authentication application 360 to compare received authentication credentials to the stored authentication credentials when determining whether a user is authorized for viewing certain information, or for determining which information is displayed via one or more AR system(s) 120 automatically as an augmented overlay. For example, all users may see a baseline augmentation of the managing entity system 200 portal or interface, but only certain users who provide stepped-up authorization credentials via the AR systems 120 or user device 130 may receive a fully augmented view of certain information, such as user account information, system resources, system architecture or status, or the like. The user data 364 may comprise any additional information that the authentication application 360 may store for use in authenticating a user (e.g., establishing a contactless NFC chip for a user to authenticate via their user device 130, or the like).

The network server application 340, the resource management application 350, and the authentication application 360 are configured to invoke or use the application data 352, the authentication data 362, and the user data 364, when communicating through the network communication interface 310 with the managing entity system 200, the one or more user device(s) 130, the AR system 120, and/or third party systems 140.

The augmented display system 300 may also contain a machine learning engine 366 and machine learning dataset(s) 368. The machine learning engine 366 may store instructions and/or data that may cause or enable the augmented display system 300 to receive, store, and/or analyze data received by the managing entity system 200, user's device 130, or AR system 120. The machine learning engine 366 and machine learning dataset 368 may store instructions and/or data that cause or enable the augmented display system 300 to determine patterns and correlations within received user data. In some embodiments, the machine learning dataset(s) 368 may contain data relating to user activity or device information, which may be stored in a user account managed by the managing entity system 200.

The machine learning engine 366 may receive data from a plurality of sources and, using one or more machine learning algorithms, may generate one or more output statistics stored in the machine learning dataset(s) 368. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. It is understood that additional or alternative machine learning algorithms may be used without departing from the invention. Data generated by the machine learning engine 366 may be utilized by the augmented display system 300 in order to inform recommendations for one or more users. For instance, machine learning engine 366 may identify that a certain percentage of users experienced increased productivity (as determined by interaction time with one or more applications associated with productivity) when implementing a certain augmented reality aspect via AR system 120, and may recommend those certain aspects to other similar users.

FIG. 4 provides a block diagram illustrating a user device 130 in more detail, in accordance with embodiments of the invention. In one embodiment of the invention, the user device 130 is a mobile telephone, laptop, desktop, or the like. Other types of computing devices may include augmented reality systems, televisions, monitors, consoles, smart assistants, or other internet-of-things connected devices, such as standalone cameras, video recorders, audio/video players, GPS devices, wearable devices, electronic kiosk devices, or the like.

Furthermore, it should be known that multiple user device(s) 130 may be owned by or accessed by the user 110 within the system environment 100 of FIG. 1, and these separate user device(s) 130 may be in network communication with each other and the other systems and devices of the system environment 100, such as augmented display system 300, managing entity system 200, and AR system 120. For example, a first user device 130 may comprise a mobile phone of the user 110 that includes an interface for working in concert with a second user device 130 that comprises a personal computer of the user 110 or an AR system 120 of the user 110. For instance, in some embodiments, a first user device 130 may be used for biometric authentication of a specific user, a second user device 130 may act as a desktop or laptop workstation of the specific user, and a AR system 120 may be enabled to augment the details transmitted to be displayed via the first or the second user device 130. In some embodiments, the AR system 120 may be configured to display virtual representations of one or more devices. For example, a user device 130 such as a mobile phone may reside in a user's pocket, and may be displayed via the AR system 120 as a desk phone situated on the user's workstation. In such embodiments, the AR system 120 may interface with the user device 130 via wireless communication, such as a local area network, Bluetooth connection, or the like, in order to receive data from the user device 130 and display status information, incoming call information, messages, or the like, in a visual manner in the user's field of view. As such, any or all of the described components herein with regard to FIG. 4 may exist in the first user device 130, the second user device 130, and so on. In some embodiments, the AR system 120 is considered to be a specialized subset of user device 130, and as such, may contain the same or similar components as described with regard to user device 130, and is used to route information from one or more user devices 130 to the augmented display system 130.

Some embodiments of the user device 130 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the user device 130. For example, the processor 410 may include a digital signal processor device, a microprocessor device, and various analog to digital converters, digital to analog converters, and/or other support circuits. Control and signal processing functions of the user device 130 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the user device 130 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of a wireless network. In this regard, the user device 130 may be configured to operate with one or more air interface standards, communication protocols, modulation types, and access types. By way of illustration, the user device 130 may be configured to operate in accordance with any of a number of first, second, third, and/or fourth-generation communication protocols and/or the like. For example, the user device 130 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols, fifth-generation (5G) wireless communication protocols, millimeter wave technology, and/or the like. The user device 130 may also be configured to operate in accordance with non-cellular communication mechanisms, such as via a wireless local area network (WLAN) or other communication/data networks, such as a Bluetooth network standard for the short-range wireless interconnection of electronic devices.

As described above, the user device 130 has a user interface that is, like other user interfaces described herein, made up of user output devices 436 and/or user input devices 440. The user output devices 436 include a display 430 (e.g., a liquid crystal display, organic light emitting diode display (OLED), or the like) and a speaker 432 or other audio device, which are operatively coupled to the processor 410. In some embodiments, the display 430 may be a visual projection overlay type display for projection of information on a user's field of vision via a glass or polymer surface worn over the user's eyes. The user input devices 440, which allow the user device 130 to receive data from a user such as the user 110, may include any of a number of devices allowing the user device 130 to receive data from the user 110, such as a keypad, keyboard, touch-screen, touchpad, microphone, mouse, joystick, other pointer device, button, soft key, and/or other input device(s). The user interface may also include a camera 480, such as a digital camera or other optical sensor for receiving data on the user's surroundings. In some embodiments the camera 480 may be used to aid in determining the position of the user's view with respect to the display 434. For instance, the camera may be located at a fixed position with respect to the display 434, and may use image data in conjunction with data received from the positioning system deice/infrared receiver 475 in order to determine location or orientation of the user's gaze, or the location or orientation of one or more AR systems 120. In some embodiments, the AR systems 120 may contain specialized light emitting or infrared light emitting sources that interface with the user device 130.

The user device 130 may also include a positioning system device/infrared receiver 475 that is configured to be used by a positioning system to determine a location of the user device 130. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the user device 130. In other embodiments, the positioning system device 475 includes a proximity sensor or transmitter, such as an RFID tag, infrared receiver, or the like, that can sense or be sensed by devices known to be located proximate to the user device 130, such as one or more AR systems 120. The infrared receiver may be used to track one or more infrared light emitting sources on the AR systems 120 in order to determine the exact orientation and change in orientation of a user's view with respect to the display 434.

In other embodiments, the augmented display system 300 may process information received from the AR system 120 in order to determine the orientation of the user's gaze. For instance, the AR system 120 may contain a gyroscope, infrared light sensor, Light Detection and Ranging (LiDAR) sensor, or the like, which may provide data to the augmented display system 300 for further processing. LiDAR systems of the AR system 120 may employ the use of Time of Flight (ToF) principles, wherein light is emitted at time t–0, hits an object, is reflected back, and is then measured by an array of sensors at time t–1. Based on knowledge about the speed of light, the measured interval—the ToF—can easily be converted into a precise distance. In some instances, considering how much light is returned, the size and shape of the object can also be determined, and may be used by the augmented display system 300 in order to generate virtual visualizations in the correct aspect ratio, size, perspective, or the like. Such calculations and analysis of the user's surroundings may be occurring continuously over a period of time as the user is engaging with the AR system 120. In some embodiments, analysis of the user's surroundings via processing of received LiDAR and video information may be performed locally on the AR system 120 via a positioning system 475 in conjunction with processor 410, or one or more specialized processors with dedicated onboard resources for processing positioning data.

The user device 130 further includes a power source 415, such as a battery, for powering various circuits and other devices that are used to operate the user device 130. Embodiments of the user device 130 may also include a clock or other timer 450 configured to determine and, in some cases, communicate actual or relative time to the processor 410 or one or more other devices.

The user device 130 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the user device 130 and/or one or more of the process/method steps described herein. For example, the memory 420 may include such applications as a conventional web browser application 422, or the resource management application 350, or an augmented display enabled application 423. These applications also typically instructions to a graphical user interface (GUI) on the display 430 that allows the user 110 to interact with the user device 130, the managing entity system 200, the augmented display system 300, one or more AR systems 120, or other devices or systems. In some embodiments, the augmented display enabled application may be used by the augmented display system 300 in order to track the user's input via one or more connected peripherals, or the like, and the augmented display system may transmit information to the user device 130 for display via the augmented display enabled application 423, while simultaneously transmitting information designed to overlay the augmented display enabled application 423 to one or more AR systems 120.

The resource management application 421 may comprise an application stored in the memory 420 that is configured to control and/or communicate with the mobile device system 400 to receive data or information (e.g., codes, signals, or the like) from the user device 130. The resource management application 421 may also be configured to communicate information received from the web browser application 422, and/or the augmented display enabled application 423. In some embodiments, the resource management application 421 may be configured to receive instructions from a separate system (e.g., the managing entity system 200, the augmented display system 300, a separate user device 130, and/or a third party system 140, such as a merchant system), and cause one or more components of the user device 130 to perform one or more actions. For example, the resource management application 421 may be configured to receive instructions for generating an alert on the user device 130 via audio or visual signals. The resource management application 421 may also cause the user device 130 to store or erase certain information located in the memory 420 based on executed resource management actions.

The memory 420 can also store any of a number of pieces of information, and data, used by the user device 130 and the applications and devices that make up the user device 130 or are in communication with the user device 130 to implement the functions of the user device 130 and/or the other systems described herein. For example, the memory 420 may include such data as transaction history data, positional data of the user device 130, biometric authentication information for the user 110, device identifiers for one or more other user devices 130, wireless network authentication information, or the like.

FIG. 5 provides a process flow 500 for providing a dynamically augmented display overlay, in accordance with embodiments of the invention. As shown in block 502, the process begins whereby the augmented display system 300 receives user interaction data (e.g., cursor location, detected positioning or infrared receiver data, or the like) and application data from user device 130. In some embodiments, this may include the application which is currently active and compatible with the augmented display system 300, as well as the user's current focus within the application. As discussed, this may also include additional information pertinent to the user's level of authentication or tiered access, which may change over time based on the task of the user (e.g., if the user is in an actively authenticated session on the user device 130, if the user is currently responding to a particular customer as indicated by an active phone call, or the like).

As shown in block 504, the system 300 may determine augmented overlay information for one or more items currently being displayed on the user device 130 based on the user interaction data and application data. For instance, if the user's cursor is currently hovering over an item "Server 1" in a diagnostic report or monitoring application, the system 300 may determine that the augmented overlay information should include a drop down menu of additional current status information for "Server 1." Likewise, if the user's cursor is currently hovering over an "account 1" of a particular customer for which they are assisting via a customer relationship management application, the system may determine that additional account details, such as transaction history, account limits, current offers, or the like should be displayed via a drop down menu overlay.

Next, as shown in block 506, the system 300 may receive imaging data from the AR system 120. The imaging data may be received in a constant stream of frames, such as a video stream, wherein each frame of the image data is analyzed by the system 300 in order to determine a frame of reference. In some embodiments, the imaging data received from AR system 120 may be in the form of LiDAR imaging data, which detects a distance of the user from nearby surroundings and allows the augmented display system 300 or the AR system 120 to determine the shape of one or more surrounding surfaces. This data steam may be constantly fed to the augmented display system 300 in order that it can react in real time to transmit relevant data to the AR system 120 for display in the user's visual frame of reference (e.g., as the user's head turns left, virtual objects in the user's right field of view may be phased out to coincide with the user's natural movement).

Additionally, the AR system 120 may transmit gyroscopic data in order for the augmented display system 300 to determine a speed and direction of movement of the user's head, and determine the frame of reference of the user. In some embodiments, the user may be prompted to do an initial 360 degree turn around the user's workspace in order for the system to gain a reference of how large the workspace is, and what surfaces exist within the workspace, in order to accurately and seamlessly overlay virtual information. As the system forms a baseline for the user's surroundings, it may utilize one or more static reference points identified around the user in order to calculate an appropriate perspective view for virtual visual overlay of display information. The augmented display system 300 may contain a catalog of three dimensional renderings of potential objects to display via the AR system 120, and may determine an appropriate scale, perspective, or the like for those objects according to the distance, surface area, surface shapes, or the like surrounding the user in their workspace. For instance, measuring the distance of the AR system 120 from multiple spots on a flat desk surface adjacent the user, the augmented display system 300 can determine a perspective height of the user and infer a distance of the user's gaze with respect to each point on the flat surface. As an example, by measuring the distance of the AR system 120 from two points on a flat surface, the system may perform an angle calculation from a singular point of the LiDAR sensor in order to triangulate a distance between the two points, and scale one or more virtual objects in relation. The system may repeat similar calculations for multiple points at known angular distances from one another in order to measure a slope of the surface from the user's perspective assuming the LiDAR sensor is situated at or near the viewer's gaze (such as on either end of the frame of a pair of glasses, or the like).

As shown in block 508, the system 300 may perform a contour analysis and determine one or more appropriate locations for display of augmented overlay information based on the imaging data received from the AR system 120. For instance, one or more three dimensionally rendered virtual objects may be require a given amount of space, surface area, or the like, to be displayed via the AR system 120. As an example, a virtual picture frame may be rendered to appear as an 8 inch by 10 inch photo frame. As such, an "appropriate" location for the virtual picture frame would be a surface in the user's surroundings identified as a vertical wall with at least a surface area of 80 square inches. As shown in block 510, the system 300 may periodically or continually update augmented overlay information transmitted to the AR system 120 based on received imaging data, user interaction data, and application data. For instance, the system 300 may alter the perspective view of a rendered virtual object based on the user's movement, may animate or dynamically alter the virtual object based on user interaction data from one or more user devices or the AR system 120, or may dynamically alter the virtual object based on application data such as data received from the user configuring the augmented environment (e.g., the user may upload a family picture for display in the augmented environment via an application on the user device 130, or the like).

FIG. 6 provides a process flow 600 for providing a user configured augmented display overlay, in accordance with embodiments of the invention. As shown in block 602, the process begins whereby the augmented display system 300 receives user preference selections for workspace environment and stores these selections in a user configuration datastore on the system 300. The user may interface with the system 300 via one or more user device(s) 130 via the augmented display enabled application 423, web browser application 422 (e.g., a web portal interface, or the like), or a resource management application 350. The user may create or be assigned login credentials for logging into the system 300 and configuring their unique user configuration settings, or the like. For instance, the user may be able to manage compatible user device(s) 130, set preferences for workplace environment virtual items, configure notification settings, configure accessibility settings, configure gesture settings, or the like.

As shown in block 604, the system must first determine a perspective view and surface structure of the user's surroundings before an augmented display for their workspace can be implemented. As such, each time the user changes location or starts a new session with the system 300, the system 300 will receive data from the AR system 120 or the user device 130 in order to determine the surface structure of the user's surroundings. For instance, the user may be prompted to turn their head in a 360 degree spherical manner such that the AR system 120 can detect surface structures via video image data and LiDAR sensing. The system may prompt the user via the AR system 120 or the user device 130 to save a particular configuration if the user is in a setting where they will repeatedly use the system 120, and this data may be logged in the users' unique user configuration on the system 300. In some embodiments, the user may be prompted to set a reference point in a particular workspace, such as a static surface, item, or the like in the workspace that the system 300 can use to expedite the process of orienting to the user's surroundings at a later time.

Moving to block 606, the augmented display system 300 may identify one or more compatible user devices on a shared network, such as network 150, or a LAN to which both the augmented display system and one or more user device(s) 130 are connected. In other embodiments, the augmented display system 300 may interface with one or more user device(s) 130 via a short range connection, such as Bluetooth or NFC, with the AR system 120. A "compatible" device as used herein is a device with an augmented display enabled application 423 installed, or other like application or permissions setting which allows notification and information sharing between the user device 130 and the augmented display system 300. As such, the compatibility of the user device 130 may not depend on the characteristics of the device itself, but may depend on the augmented display system 300 current supported list of devices and operating systems, which may be updated over time to include an increasing variety of device types.

The augmented display system 300 may prompt the user device 130 to undergo an onboarding process wherein the user of the user device 130 is asked for permission to access certain data or run certain applications in the background of the device. In some embodiments, the user may be prompted via the user device 130 each time the user device 130 is operatively connected to the augmented display system 130 or AR system 120. In other embodiments, the onboarding process may be a one-time permission-grant or settings configuration that allows the user device 130 to interface with the augmented display system 300 or AR system 120 indefinitely until either permissions are revoked, one or more AR system(s) 120 are disconnected, the connection with the device is lost, or the user ends their session with the AR system 120 or augmented display system 300. Compatible user devices may be utilized by the system 300 in order to visualize an overlay of information (e.g., overlay additional information aligned with a computer screen, or the like), or enhance the user's experience with compatible devices (e.g., overlay a three dimensional representation of the device that the user may interact with via the AR system 120, or the like).

Next, as shown in block 608, the system 300 may display user preference selections for the workspace environment. Once the user has configured their preferences for their ideal workspace setting, the system will track the user's gaze via the AR system 120 and display virtual objects or images around the user. In some embodiments, these virtual objects may be interactive. In other embodiments, these objects may be representative of other compatible user devices 130. For instance, the user may configure a picture frame of their family or friends to be displayed on the desk area to their right, or on the wall to their left. The user may configure the landscape outside their window to be a particular place, setting, weather, or the like. In other embodiments, the user may configure the system 300 to display an overlay of one or more saved settings in their user configuration. For example, the user may have saved a configuration for their workplace cubicle or office, wherein the system 300 received video and surface structure information for that workspace. At a later time, the user may be working remotely from their home, and they may choose to overlay the surroundings of their office workplace environment in their home office. In this way, the AR system 120 may receive a constant data stream from the system 300 that coincides with a three dimensional rendering of the office workspace, such that the user feels as though they are in their office space. In some embodiments, the user may wish to employ an opposite approach, and may prompt the system to emulate a saved workspace from their home, or a vacation they recently took, and have the system 300 transmit a three dimensional rendering of saved video and surface data corresponding to that space, such that the user feels as though they are in that space while they are in their workplace cubicle, or the like.

In some embodiments, the system 300 may integrate the experience of multiple users in a collaborative fashion. For instance, the system 300 may be configured to store a library of certain common workspace environments accessible to multiple users in a collaborative fashion, such as a conference room setting, or the like. In this way, the system 300 may receive data from multiple AR systems 120 and orient multiple users around a virtual conference table. In some embodiments, the users may be represented to one another via avatars, or the like, wherein the avatars may be rendered continually to reflect the users' gaze, speech, or the like. It is understood in these embodiments, the data transmitted to each of the multiple AR systems 120 in the collaborative setting may overlap, but may also differ to account for the difference in perspective view of the users. For instance, if there are multiple users situated around a conference room table, a user who looks to their left may appear to look "right" with respect to the user directly across from them, and so forth. In this way, the system may continually track the movement and perspective of the users in the collaborative setting, and may continually adjust each user's augmented visual overlay accordingly in response to user movement or other transmitted data, as noted in block 610. The system 300 may continually update data transmitted for display via the AR system 120 in response to user movement, whether or not the user is in a collaborative or a private session with the system 300.

It is noted that, in some embodiments, a collaborative visual overlay between AR systems 120 may be achieved with a number of different types of AR system 120 devices. For instance, the perspective of one particular user may be emulated in embodiments where the user is wearing a headset type device for augmenting and reacting to the user's first-person frame of reference. However, in further embodiments, the AR system 120 may be a projection-driven device, wherein the AR system 120 projects a hologram onto one or more users' surroundings. For instance, the AR system 120 may be configured to display a three dimensional projection which can be seen without the user wearing any special equipment, such as cameras or glasses. In these embodiments, the AR system 120 may include one or more imaging devices which not only transmits information on the environmental surroundings of the user, but also a real-time location of the one or more users themselves. In this way, the augmented display system 300 may coordinate the projected information between multiple AR systems 120 to not only display a common environment and user-specific perspectives, but also coordinate the data transmitted to each AR system 120 in order to project a three dimensional image or visualization of one or more users, or their avatars, in a common virtual environment.

In some embodiments, the workspace environment generated by the augmented display system 300 and displayed via the AR system(s) 120 may include various interactive components in order to not only increase productivity, but also improve the ergonomics and accessibility features of the user(s) workspace or device ecosystem. For instance, the augmented display system 300 may be utilized to allow the user increased convenience and accessibility to in completing various user device related tasks. For instance, in some embodiments, the augmented display system 300 may provide gesture control to users who may require assistance with motor control. The augmented display system 300 may receive various data from multiple user devices, including, but not limited to, the AR system 120, such as image data, infrared sensor data, gyroscope data, LiDAR data, or the like, which allow the augmented display system 300 to analyze the direction of the user's gaze, location of the user within their environment, movement of the user in any of these respects, and the relative velocity or acceleration of the user's movement in any of these respects.

For example, a user may use gesture programming wherein the augmented display system 300 stores one or more gesture preferences in a user configuration. It is understood that any number of user movements or gestures can be programmed in relation to any number of device or application operations. For example, in some embodiments, a user may configure the augmented display system 300 to recognize nodding of the user's head up and down instructs the system to answer an incoming call, or the like. In further embodiments, the user may gesture toward a virtual device or one or more connected physical devices that the user would like the call forwarded to, or the like. For instance, as the user receives a video call from their physical mobile phone, the user may wish to answer the call or have the video stream of the call projected or otherwise visualized in their augmented workspace in some way, such as on a nearby wall, or the like. If the user shakes their head from left to right, the augmented display system 300 may be configured to deny the call, or the like. In other embodiments, the user may interact physically with one or more aspect of the augmented display system 300, such as a joystick, touch pad, one or more buttons, or the like, in order to respond to incoming notifications. It is understood that this is only one specific embodiment provided for exemplary purposes, but that the system may be configured in any number of ways to integrate with various application and operating systems in order to automate actions of one or more connected devices or manipulate the augmented reality environment of the user.

FIG. 7 provides a process flow 700 for integrating one or more user devices with a dynamically augmented display overlay, in accordance with embodiments of the invention. As shown in block 702, the process begins wherein the augmented display system 300 identifies one or more compatible user devices on a shared network, such as network 150, or a LAN to which both the augmented display system and one or more user device(s) 130 are connected. In other embodiments, the augmented display system 300 may interface with one or more user device(s) 130 via a short range connection, such as Bluetooth or NFC, with the AR system 120. A "compatible" device as used herein is a device with an augmented display enabled application 423 installed, or other like application or permissions setting which allows notification and information sharing between the user device 130 and the augmented display system 300. As such, the compatibility of the user device 130 may not depend on the characteristics of the device itself, but may depend on the augmented display system 300 current supported list of devices and operating systems, which may be updated over time to include an increasing variety of device types. The augmented display system 300 may prompt the user device 130 to undergo an onboarding process wherein the user of the user device 130 is asked for permission to access certain data or run certain applications in the background of the device. In some embodiments, the user may be prompted via the user device 130 each time the user device 130 is operatively connected to the augmented display system 130 or AR system 120. In other embodiments, the onboarding process may be a one-time permission-grant or settings configuration that allows the user device 130 to interface with the augmented display system 300 or AR system 120 indefinitely until either permissions are revoked, one or more AR system(s) 120 are disconnected, the connection with the device is lost, or the user ends their session with the AR system 120 or augmented display system 300.

The system 300 may also receive application data or user interaction data and map the image data received from the AR system 120 based on a convolutional neural network processing of the image data (e.g., the system 300 may identify a contour map in the image data and use this to predictively identify objects within it), as shown in block 608. Finally, as shown in block 610, the system 300 may periodically update the augmented display overlay information transmitted to the AR system 120 based on the received imaging data, user interaction data, user device data, and application data. In this way, the system 300 may constantly respond to changing information on the user device 130 and constantly respond to changes in the viewers gaze in order to map an overlay of information consistently and seamlessly via the AR system 120.

As shown in block 704, the system may determine a three dimensional rendering and notification style for each "type" of compatible user device 130. For instance, a compatible user device 130, such as a mobile phone, may be rendered in a virtual fashion in a number of ways, such as an emulation of the mobile device itself, a representation of the device via a different structure (e.g., a mobile phone represented by a virtual desk phone, or the like), or a combination of representations. For instance, as a mobile phone rings in the user's pocket, the system 300 may transmit data to the AR system 120 in order to show a desk phone ringing on the desk surface next to the user. In some embodiments, this may be accompanied by an overlaid notification, such as a text window in the user's field of view which animates to show who is calling, and options for accepting, denying, or forwarding the call. The user may configure particular gestures or movements to coincide with responding to notifications. For instance, as the user receives a call, they may configure the system 300 to recognize that nodding their head up and down instructs the system to answer the call and forward the audio to a headphone device, Bluetooth device, a speaker located on the AR system 120, or the like. If the user shakes their head from left to right, the system 300 may be configured to deny the call, or the like. In other embodiments, the user may interact physically with one or more aspect of the AR system 120, such as a joystick, touch pad, one or more buttons, or the like, in order to respond to incoming notifications.

Next, the system 300 determines a location in the user surroundings for placement of the virtual rendering of the compatible device. For instance, the system 300 may display via the AR system 120 multiple different options for placing a virtual desk phone on their workspace area. The user may adjust their gaze in the direction that they would like the virtual rendering to be placed, and may indicate to the system 300 via audio, gesturing, touch interaction with the AR system 120, or the like, a confirmation of where the virtual rendering should be placed. The system 300 may then save this location and virtual rendering, and associated compatible device data and permissions, in the unique user configuration on the system 300. If the user would like to implement a previously configured compatible device in a new virtual or augmented workplace environment, the system 300 may access the settings for a previously configured device and allow the user to quickly place that device or virtual rendering within a new environment. One the device is configured, the system 300 may receive interaction information from one or more user device(s) 130, as shown in block 708, and may transmit continually updated display information to the AR system 120 according to the interaction information received, as shown in block 710. For instance, the system 300 may receive interaction information from a mobile phone and display a notification in the user's view via the AR system 120.

In a collaborative setting, one or more compatible user devices 130 may only be displayed to the user who owns or configured the compatible device; however, in some embodiments, it may be advantageous for others in the collaborative setting to receive visual indications that a user is interacting with one or more devices. For instance, in a conference setting, a user's avatar may be "grayed out" and visually depicted alongside a notification of "on separate call" or the like to indicate to the other users in the meeting that the user needed to take an important call. In this instance, the system 300 may intelligently stop transmitting audio information from the AR system 120 of the user who took the call to the collaborative setting in order to give the user some privacy. In still further embodiments, it may be advantageous for a user to share compatible device information with a collaborative setting, such as screen-sharing during a presentation, or the like. In this way, the system 300 may display a screen view of one or more compatible devices of the user to other users in a collaborative environment at the user's discretion.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, or the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted, or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined, or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for dynamically augmenting a user environment, the system comprising:
   a memory device; and
   a processing device operatively coupled to the memory device, wherein the processing device is configured to execute computer-readable program code to:
   receive one or more user preference selections for a workspace environment and store the user preference selections in a unique user configuration;
   receive imaging data from an augmented reality system or a user device;
   based on the received imaging data, determine a perspective view and surface structure of a user's surroundings;
   identify one or more compatible user devices on a shared network of the one or more compatible user devices and the augmented reality system;
   determine an access level for a user based on receiving one or more authentication credentials and task information;
   continually transmit a display of one or more virtual objects to the augmented reality system based on the user preference selections, received imaging data, and the access level for the user, wherein the display of the one or more virtual objects is dynamically altered in response to changes to the task information;
   identify, via a machine learning engine, a percentage of users experiencing increased productivity, wherein increased productivity is determined by interaction time with one or more applications when implementing a specific augmented reality aspect via the augmented reality system; and
   based on identifying the percentage of users experiencing increased productivity, recommend the specific augmented reality aspect to one or more other users.

2. The system of claim 1, further configured to determine the one or more virtual objects based on one or more authentication credentials provided by a user via the user device.

3. The system of claim 1, wherein the one or more virtual objects further comprise three dimensional virtual renderings or representations for the one or more compatible user devices.

4. The system of claim 1, wherein the imaging data further comprises light detection and ranging (LiDAR) data.

5. The system of claim 1, further configured to receive notification information from the one or more compatible user devices; and
    alter display of the one or more virtual objects in response to the notification information.

6. The system of claim 1, wherein continually transmitting a display of one or more virtual objects further comprises transmitting display information at a refresh rate of at least 30 frames per second.

7. The system of claim 1, further configured to receive notification information from the one or more compatible user devices; and
    transmit an interactive notification prompt to the augmented reality system.

8. A computer program product for dynamically augmenting a user environment, the computer program product comprising at least one non-transitory computer readable medium comprising computer readable instructions, the instructions comprising instructions for:
    receiving one or more user preference selections for a workspace environment and store the user preference selections in a unique user configuration;
    receiving imaging data from an augmented reality system or a user device;
    based on the received imaging data, determining a perspective view and surface structure of a user's surroundings;
    identifying one or more compatible user devices on a shared network of the one or more compatible user devices and the augmented reality system;
    determining an access level for a user based on receiving one or more authentication credentials and task information;
    continually transmitting a display of one or more virtual objects to the augmented reality system based on the user preference selections, received imaging data, and the access level for the user, wherein the display of the one or more virtual objects is dynamically altered in response to changes to the task information;
    identifying, via a machine learning engine, a percentage of users experiencing increased productivity, wherein increased productivity is determined by interaction time with one or more applications when implementing a specific augmented reality aspect via the augmented reality system; and
    based on identifying the percentage of users experiencing increased productivity, recommending the specific augmented reality aspect to one or more other users.

9. The computer program product of claim 8, further configured to determine the one or more virtual objects based on one or more authentication credentials provided by a user via the user device.

10. The computer program product of claim 8, wherein the one or more virtual objects further comprise three dimensional virtual renderings or representations for the one or more compatible user devices.

11. The computer program product of claim 8, wherein the imaging data further comprises light detection and ranging (LiDAR) data.

12. The computer program product of claim 8, further comprising:
    receiving notification information from the one or more compatible user devices; and
    altering display of the one or more virtual objects in response to the notification information.

13. The computer program product of claim 8, wherein continually transmitting a display of one or more virtual objects further comprises transmitting display information at a refresh rate of at least 30 frames per second.

14. The computer program product of claim 8, further comprising:
    receiving notification information from the one or more compatible user devices; and
    transmitting an interactive notification prompt to the augmented reality system.

15. A computer implemented method for dynamically augmenting a user environment, said computer implemented method comprising:
    providing a computing system comprising a computer processing device and a non-transitory computer readable medium, where the computer readable medium comprises configured computer program instruction code, such that when said instruction code is operated by said computer processing device, said computer processing device performs the following operations:
    receiving one or more user preference selections for a workspace environment and store the user preference selections in a unique user configuration;
    receiving imaging data from an augmented reality system or a user device;
    based on the received imaging data, determining a perspective view and surface structure of a user's surroundings;
    identifying one or more compatible user devices on a shared network of the one or more compatible user devices and the augmented reality system;
    determining an access level for a user based on receiving one or more authentication credentials and task information; and
    continually transmitting a display of one or more virtual objects to the augmented reality system based on the user preference selections, received imaging data, and the access level for the user, wherein the display of the one or more virtual objects is dynamically altered in response to changes to the task information;
    identifying, via a machine learning engine, a percentage of users experiencing increased productivity, wherein increased productivity is determined by interaction time with one or more applications when implementing a specific augmented reality aspect via the augmented reality system; and
    based on identifying the percentage of users experiencing increased productivity, recommending the specific augmented reality aspect to one or more other users.

16. The computer implemented method of claim 15, further configured to determine the one or more virtual objects or based on one or more authentication credentials provided by a user via the user device.

17. The computer implemented method of claim 15, wherein the one or more virtual objects further comprise three dimensional virtual renderings or representations for the one or more compatible user devices.

18. The computer implemented method of claim 15, wherein imaging data further comprises light detection and ranging (LiDAR) data.

19. The computer implemented method of claim 15, further comprising:
    receiving notification information from the one or more compatible user devices; and
    altering display of the one or more virtual objects in response to the notification information.

20. The computer implemented method of claim 15, wherein continually transmitting a display of one or more virtual objects further comprises transmitting display information at a refresh rate of at least 30 frames per second.

* * * * *